United States Patent [19]

Drye et al.

[11] Patent Number: 5,188,792
[45] Date of Patent: Feb. 23, 1993

[54] POST TREATMENT OF POLYURETHANE FOAM

[75] Inventors: Jerry L. Drye, Trinity; Glen C. Cavenaugh, High Point, both of N.C.

[73] Assignee: Trinity American Corp., Trinity, N.C.

[21] Appl. No.: 834,147

[22] Filed: Feb. 10, 1992

[51] Int. Cl.$^5$ ............................................. B29C 67/20
[52] U.S. Cl. .................................... 264/232; 264/48; 264/146; 264/321
[58] Field of Search .............. 264/45.5, 48, 321, 146, 264/232, DIG. 84

[56] References Cited

U.S. PATENT DOCUMENTS

| | | | |
|---|---|---|---|
| 3,015,851 | 1/1962 | Wiles | 18/48 |
| 3,016,575 | 1/1962 | Ebneth | 264/54 |
| 3,029,473 | 4/1962 | Greenberg | 18/48 |
| 3,061,885 | 11/1962 | Rogers et al. | 18/48 |
| 3,086,248 | 4/1963 | Culp | 18/48 |
| 3,112,524 | 12/1963 | Legler | 18/6 |
| 3,265,784 | 8/1966 | Jacobs | 264/45 |
| 3,269,882 | 8/1966 | Willy | 156/78 |
| 3,456,047 | 7/1969 | Vinton et al. | 264/321 |
| 3,558,753 | 1/1971 | Edlin | 264/54 |
| 3,682,739 | 8/1972 | Tesch et al. | 264/321 |
| 3,812,227 | 5/1974 | Blackwell et al. | 264/48 |
| 3,874,830 | 4/1975 | Carter et al. | 425/4 |
| 3,884,848 | 5/1975 | Ricciardi et al. | 260/2.5 |
| 3,890,414 | 6/1975 | Ricciardi et al. | 264/48 |
| 3,901,962 | 8/1975 | Kuchuris et al. | 264/321 |
| 3,991,145 | 11/1976 | Landsman | 264/25 |
| 4,051,211 | 9/1977 | Beser et al. | 264/51 |
| 4,216,177 | 8/1980 | Otto | 264/25 |
| 4,344,903 | 8/1982 | Pascouet | 264/55 |
| 4,364,892 | 12/1982 | Rehlen et al. | 264/284 |
| 4,397,797 | 8/1983 | Nojiri et al. | 264/45 |
| 4,504,429 | 3/1985 | Griffiths | 264/40 |
| 4,537,912 | 8/1985 | Griswold | 521/53 |
| 4,567,008 | 1/1986 | Griffiths | 264/40 |
| 4,741,951 | 5/1988 | Ricciardi et al. | 428/316 |
| 4,757,093 | 7/1988 | Ricciardi et al. | 521/107 |
| 4,757,094 | 7/1988 | Teumac et al. | 521/118 |
| 4,818,775 | 4/1989 | Teumac et al. | 521/107 |
| 4,931,236 | 6/1990 | Hettinga | 264/41 |
| 4,963,593 | 10/1990 | Ricciardi et al. | 521/128 |
| 5,128,379 | 7/1992 | Stone | 521/50 |

FOREIGN PATENT DOCUMENTS

| | | |
|---|---|---|
| 044226 | 7/1981 | European Pat. Off. . |
| 058553 | 2/1982 | European Pat. Off. . |
| 2456421 | 8/1976 | Fed. Rep. of Germany . |
| 2945856 | 5/1981 | Fed. Rep. of Germany . |
| 1596771 | 7/1970 | France ............................ 264/48 |
| 46-037916 | 11/1971 | Japan ............................... 264/48 |
| WO86/04017 | 7/1986 | United Kingdom . |

OTHER PUBLICATIONS

*Toyo Rubber Chemical Industry Co., Ltd* brochure dated Jul. 19, 1990.

*Journal of Cellular Plastics* article dated Nov. 1988 pp. 431-437.

*Vertifoam and Enviro-Cure Technology* brochure dated Oct. 24, 1991 of Crain Industries, Inc.

*Primary Examiner*—Allan R. Kuhns

[57] ABSTRACT

A post treatment for cellular foam blocks such as polyurethane which includes recirculating reactant laden air through a foam block which has been slit along opposing side faces following formation. The faces are slit to a depth of one-eighth to three-eights inches with adjustably fixed knives. The slit foam block is then covered and positioned against a blower assembly in an air infiltration chamber and one side of the block is urged against air inlets whereby air is directed into the opposite face where it passes through the foam and is recirculated thereby removing the heat and finalizing the cure of the foam in a complete and consistent manner with better compression-set properties.

19 Claims, 5 Drawing Sheets

POST TREATMENT OF POLYURETHANE FOAM

BACKGROUND OF THE INVENTION

1. Field of The Invention

The process presented pertains to the manufacture of cellular foam and particularly to a post treatment of polyurethane foam for greater structural consistency when formed on a continuous production line.

2. Description of the Prior Art And Objectives of The Invention

Polyurethane and other cellular foams are generally formed in continuous or batch processes whereby liquid chemical components are mixed and the reaction results in a foam of substantially desired density and compression qualities. For production of a polyurethane foam, a polyol, water and diisocyanate are reacted in the presence of a catalyst. In many commercial operations, the requisite chemicals are reacted proximate a conveyer to form large, substantially rectangular blocks which may be for example, forty inches high and six feet wide. Such blocks are normally formed in fifty foot lengths for convenient handling and storage purposes. Other lengths and sizes are also produced depending on the particular physical limitations and needs of the individual factory and its customers. Cellular foams such as polyurethanes are used in the furniture, bedding and other industries and the particular characteristics of the foam such as density, resiliency and firmness can be varied greatly depending on the required end use. As the chemical reaction of manufacture is largely exothermic, a great amount of heat is held and contained within the inner portion of the foam block as the foam surrounding the center acts as an insulator to hold the heat within. Immediately after production of a fifty foot length of an approximate four by six feet block, the outer surface temperature may fall to ambient room temperature within a few minutes whereas the center of the block which may be at over 250° F., may require twenty-four hours under normal environmental conditions to reach ambient temperature. The high inner temperatures of the foam block will effect the properties of the foam, such as the density and firmness characteristics while preventing in some cases the manufacturer to ship the foam the same day as it is produced.

Others have addressed these manufacturing problems in the past as taught in U.S. Pat. No. 3,890,414 which, along with German patent No. 2,456,421 provides a method for rapidly cooling polyurethane foam blocks. U.S. Pat. No. 4,537,912 also describes a process for rapidly curing polyurethane foam. While these prior processes are helpful and beneficial under certain conditions, the foam produced thereunder lacks the degree of uniformity and firmness consistency desired and some times poor compression-set properties and accordingly, the present invention was conceived.

The physical properties of foam are generally tested per ASTM D-3574 "Standard Methods of Testing— Flexible Cellular Materials—Slab, Bonded, Molded Urethane Foams". Test methods for properties of foam, i.e. density, firmness and other qualities, are found in this publication. One of these methods (Test D) is the "Constant Deflection Compression Set Test". This test mainly deals with the recovery ability property of foam to hold its dimensional stability. Briefly the procedure calls for cutting a foam specimen that has dimensions of 50×50×25 mm. This specimen is compressed 90% of its original thickness and held compressed in this state for 22 hours between two parallel plates. Further the test specimen is placed in a mechanical convected oven that has a temperature of 70°±2° C. for this time period. The thickness of the foam specimen is accurately measured before and after the test and these measurements are calculated as a percentage of original thickness or percent loss. This percent loss is known as the Compression-Set property. Values of 10% or less are considered very good and acceptable for conventional polyether flexible polyurethane foam.

It is therefore one objective of the present invention to provide an improved process for the rapid post treatment of cellular foam to produce a foam which is uniformly consistent in density and firmness characteristics and improved compression-set properties.

It is another objective of the present invention to provide a post treatment for continuously producing foam which will provide more consistency from run to run regardless of variations in ambient temperature and humidity.

It is still another objective of the invention to provide a process for post treatment of polyurethane foam whereby a foam block is slit along two opposing side faces through the outer skin to allow recirculated air to flow through the foam to quickly and uniformly post cure and cool the foam.

It is yet another objective of the invention to provide a process for post treating cellular foam whereby the midsections of the opposing faces of the foam are slit horizontally to a depth of a fraction of an inch by adjustably fixed blades in parallel alignment.

It is also an objective of the invention to provide a process for post treating cellular foam wherein air and other gases within the foam are recirculated through the foam to improve the compression-set properties of the foam while providing a rapid post treatment.

Various other objectives and advantages of the present invention will become more apparent to those skilled in the art as the detailed description below is reviewed.

SUMMARY OF THE INVENTION

A process for post treating cellular foam such as polyurethane is presented whereby the conventional polyurethane block as formed during a continuous manufacturing process is directed along a conveyer where it is slit longitudinally along opposing sides by adjustably positioned blades. Twelve or more blades may be used to form fractional-inch deep slits within the foam block horizontally as it moves along the conveyer. The block is covered with polyethylene sheeting or other nonporous materials except for the slit side facial areas after formation. Immediately after slitting, the block which may be fifty feet or more in length is brought into a contingous relation with a blower apparatus which will urge recirculated air through one slit face of the foam block and out the other. Residual gases within the block are recirculated through a foam block of conventional size and a heat exchanger for a short period of approximately twenty-five minutes whereby the block is evenly cured and reduced to ambient temperature throughout. After the air treatment the block is ready for shipping or further processing and will provide the user with a foam having a more consistent density and firmness qualities throughout, and better compression-set properties.

DESCRIPTION OF THE PREFERRED EMBODIMENT

Figure 1:
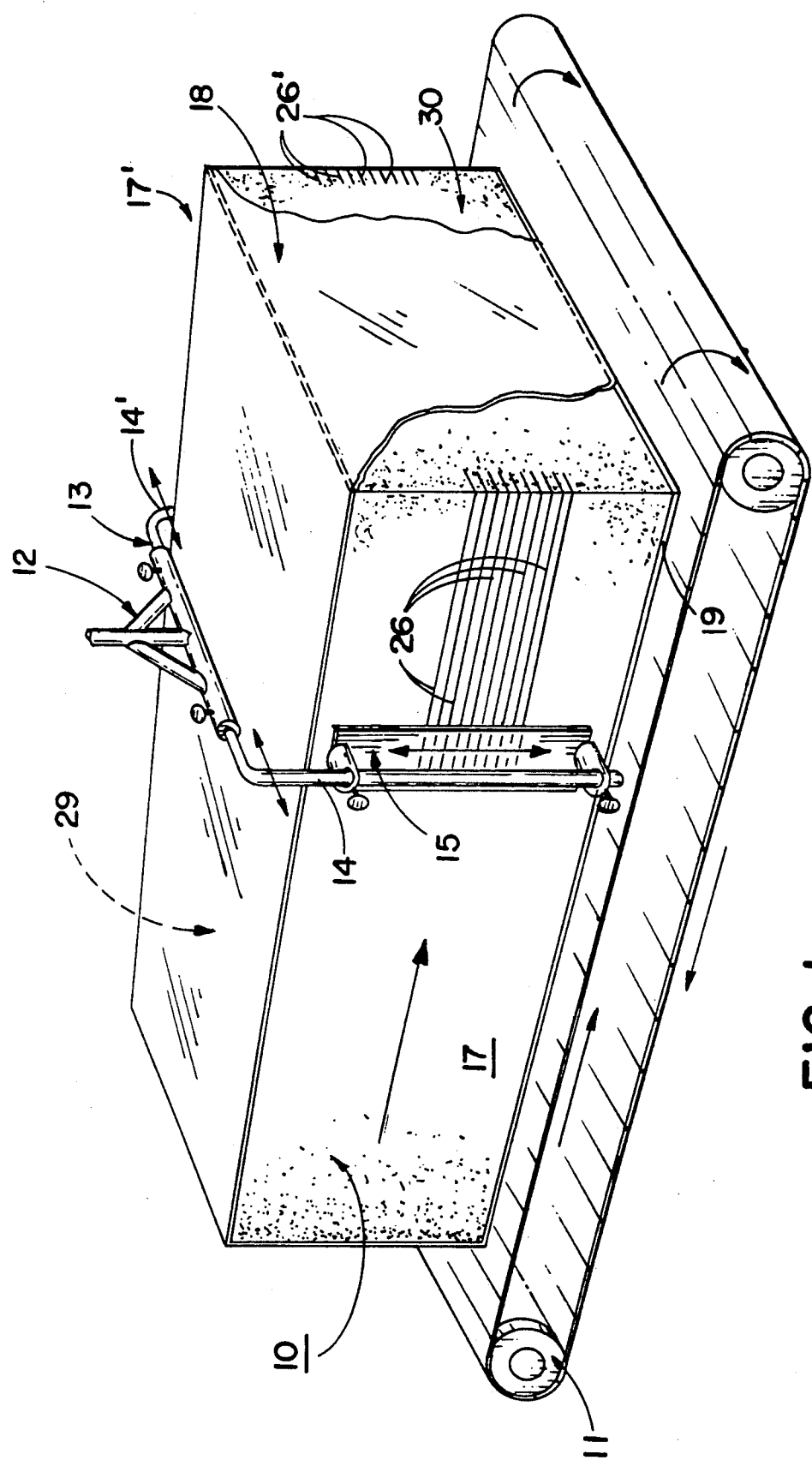
FIG. 1 illustrates a conventional foam block as it is being slit.
Figure 4:
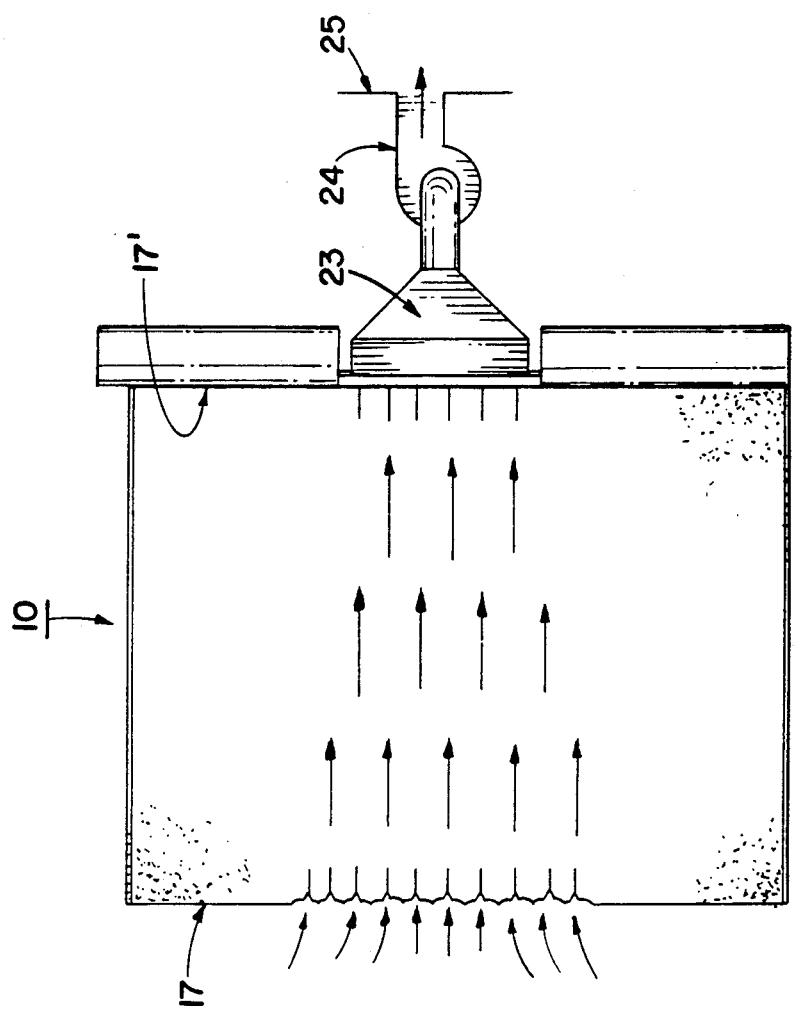
FIG. 4 shows a cross-sectional view of the block in place with air being directed therethrough.

The preferred method of the invention is illustrated in FIGS. 1 and 4 whereby a block of polyurethane foam is post treated by first longitudinally slitting the block along opposing midsectional side faces as illustrated in FIG. 1 by multiple fixed blades. As seen, the blades provide a plurality of twelve horizontal parallel slits approximately two inches apart and approximately one-quarter inch deep on each face to increase the ability of air to enter therein as the foam somewhat flexes as shown in exaggerated fashion in FIG. 7 due to the force of the blower assembly which is in contiguous relation with one side face of the slitted foam. After slitting, the top, bottom and ends if required are covered with a nonporous sheet such as a thin polyethylene. The method further provides a recirculating air flow through a foam block approximately forty inches high and six feet wide for a sufficient length of time, i.e., twenty-five minutes at 75° F. (ambient air temperature) to allow the foam to reach ambient temperature and to evenly cure with consistent firmness qualities throughout and improved compression-set properties.

DETAILED DESCRIPTION OF THE DRAWINGS AND METHOD OF OPERATION

Figure 2:
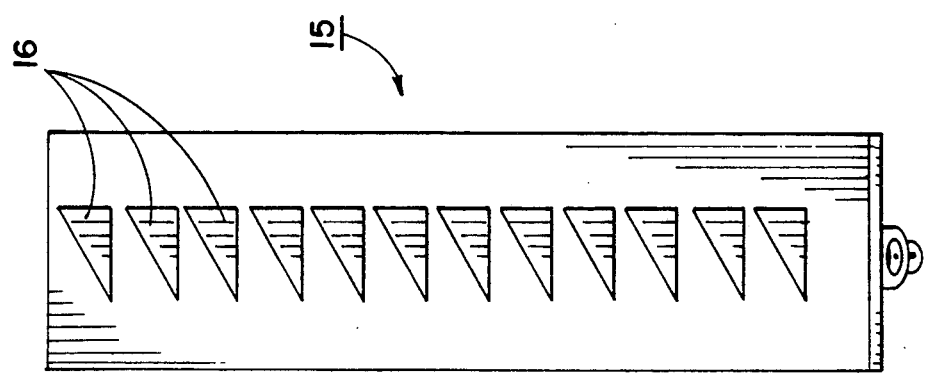
FIG. 2 demonstrates a portion of the blade platen used to slit the foam.

For better understanding the process of the invention, turning now to the drawings, FIG. 1 illustrates a conventional cellular polyurethane foam block 10 formed from a liquid polyol, water and diisocyanate reacted in the presence of a suitable catalyst and other additives in a continuous process to form a horizontal foam "bun" or block 10. It is understood by those skilled in the polyurethane foam producing art that the chemical reaction produced is of the exothermic type and the center of block 10 may reach temperatures exceeding 300° F. with residual reactants and gases remaining therein. Immediately after formation, as seen in FIG. 1, block 10 is moved along conveyer 11 into blade assembly 12 which slits block 10 on opposite side faces 17, 17'. Blade assembly 12 has a horizontal member 13 and a pair of depending arms 14, 14' which attach to and maintain blade platens 15, 15' (not shown). Blade assembly 12 is adjustable whereby depending arms 14, 14' are movable laterally of conveyer 11 for adjustment to accommodate various widths of foam blocks. The front of blade platen 15 is partially shown enlarged in FIG. 2. As illustrated in FIG. 1, block 10 may be for example forty inches in height, have a width of sixty-six inches and a length of some fifty feet. Depending arms 14, 14' are transversely movable to accommodate the various widths of blocks 10 and also for adjustment of the particular depth of foam penetration desired. As shown in FIG. 1, blade platen 15 is adjustable vertically along depending arm 14 and blade platen 15' (not shown) in FIG. 1 is adjustable along depending arm 14'. Blade platen 15 comprises a plurality of twelve thin (1 mm) razor type blades 16 (FIG. 2) vertically spaced at two inch increments therealong which can likewise be made to adjust horizontally to increase or decrease the depth of penetration along opposing side faces 17, 17' of block 10. Platen 15 is mounted proximate the midsection of face 17 to slit a portion of side face 17, for example 50-60% of the entire face height of forty inches, between the top and bottom slits 26. While platens 15, 15' are positioned on blade assembly 12, other slitting equipment could be utilized and in fact manual slitting of blocks 10 has been utilized with some degree of success although more labor cost and time is required. The thickness of the side skins and density of the foam determine in part the depth and number of slits 26 required.

As further shown in FIG. 1, nonporous cover sheet 18 is shown in place on top 29 and front end 30 of block 10 and bottom sheet 19 is shown beneath block 10. Sheet 18 is used along with sheet 19 to cover all exposed surfaces including the ends of block 10, except for side faces 17, 17' before air is drawn therethrough. Blades 16 of assembly 12 are adjusted to penetrate block 10 a fraction of an inch along side faces 17, 17' at two inch intervals of block 10 and may be set for example to one-quarter of an inch in depth to penetrate the side skin. It has been found that a range of between one-eight and three-eighths of an inch is generally satisfactory for most urethane formulations without excess waste generated from slitting for ambient air flow therethrough. As is understood, block 10, during formation produces paper-thin side skins which are practically impervious to air flow and thicker, top and bottom skins with the top skin generally being the thickest and most rigid. Earlier teachings of post cure treatments for polyurethane foam processes have encouraged "peeling" the skins and removing from one-half to three-quarters of an inch from their outer surfaces prior to air delivery therethrough. The present invention saves time, equipment and foam costs while providing better result over conventional peeling, punching, routing and other techniques to increase air entry and exit from foam block 10. In most cases, slitting to a depth of twice the skin thickness has proven satisfactory and increased depths will increase the air flow ability.

Figure 3:
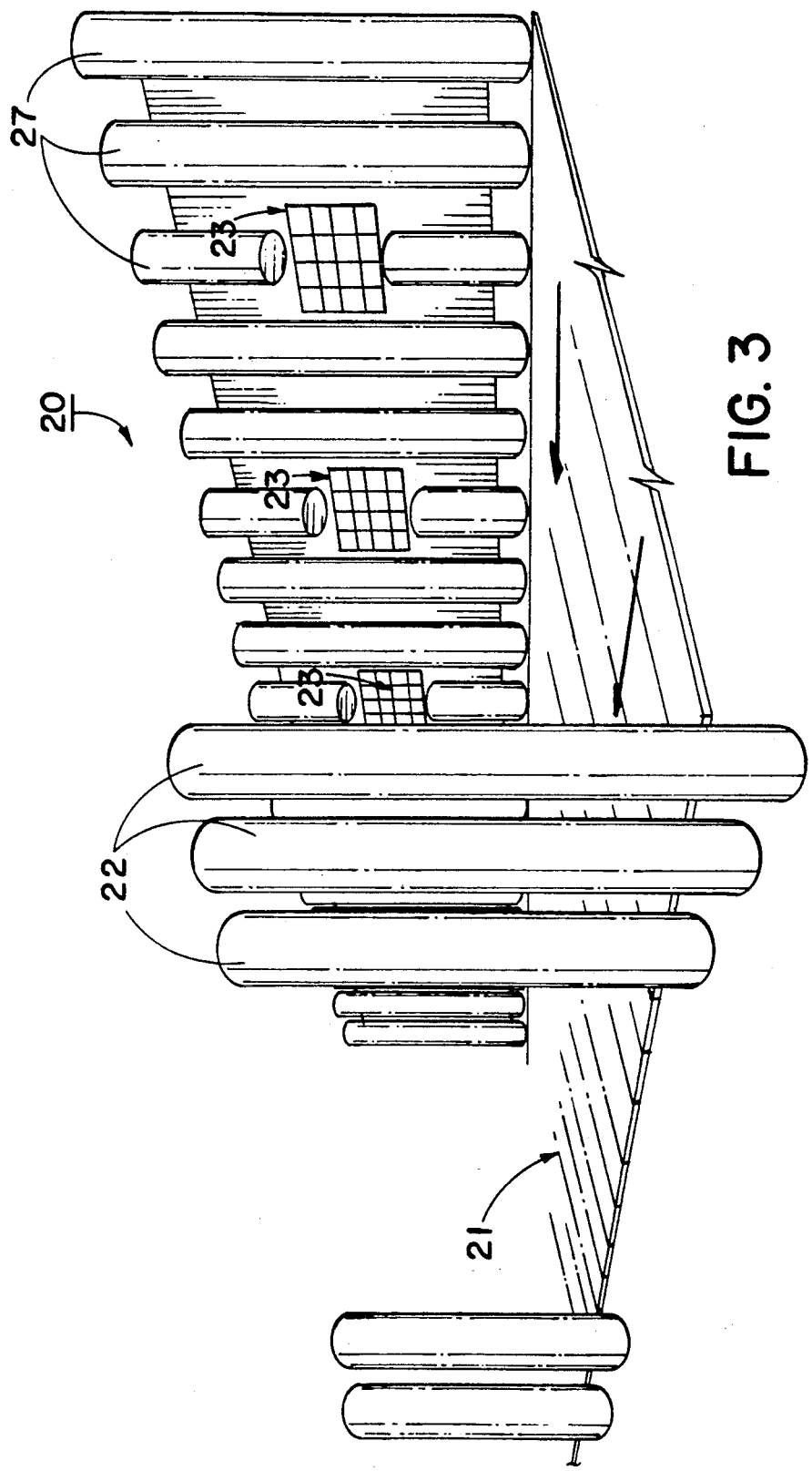
FIG. 3 depicts a portion of the ambient air chamber for post treating the foam block.

After block 10 has been slit as shown in FIG. 1, it is delivered by conveyer or otherwise to air infiltration chamber 20 as shown schematically in FIG. 3. Block 10 rolls along bottom conveyer 21 in chamber 20 where it is directed against blower inlets 23 by conveyer guides 22.

Figure 5:
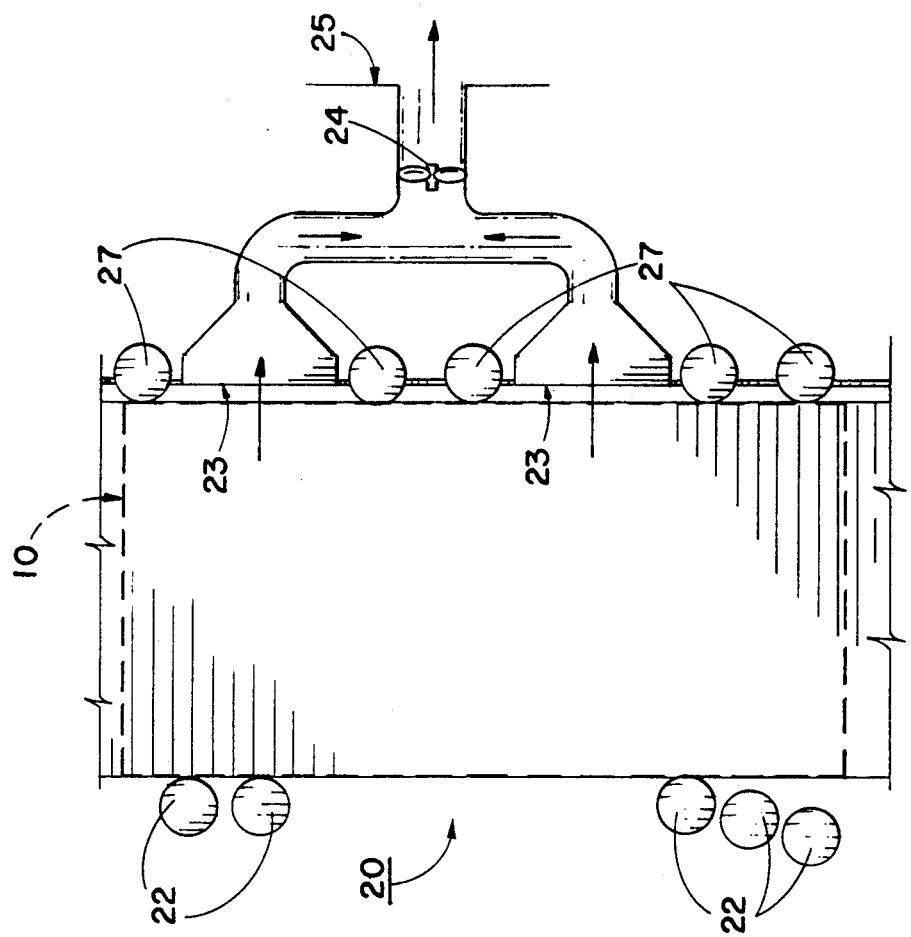
FIG. 5 pictures a top schematic view of a portion of the chamber as shown in FIG. 3.

Once block 10 is within chamber 20 which may be for example one hundred feet long to accommodate two fifty feet length blocks 10, blower 24 as shown in FIGS. 4 and 5 is activated and ambient air is directed through block 10 and thereafter may be exhausted from chamber 20 as seen in the embodiment of FIG. 5 which does not show the preferred process which recirculates the air through block 10. As further understood, chamber 20 can be substantially open and not tightly sealed for the free flow of ambient air therethrough. In FIG. 5 wall 25 illustrates an outside wall but the exhaust air may be scrubbed before discharge, depending on the particular desires and requirements imposed on the user. Conveyer guide 22 as shown in FIG. 3 directs block 10 against inlets 23 which are substantially flushly mounted with rollers 27 as shown in FIG. 5. As would be understood, rollers 27 allow block 10 to slide into place and allow block 10 to move therefrom after cooling. Blowers 24 as shown in FIGS. 4 and 5 are sized to move approximately 900 CFM of air each and twelve blowers would be present in a one hundred foot long chamber 20, with each blower attaching to two inlets 23. Each inlet 23 is approximately twenty-four by twenty-four inches in size and includes an open grill.

Figure 6:
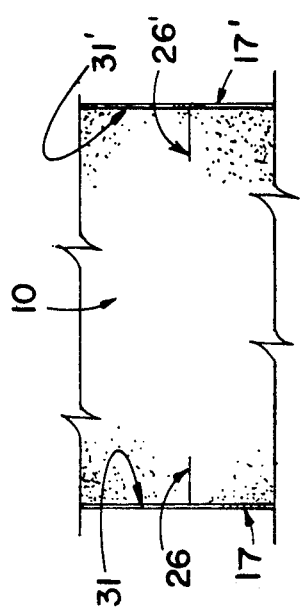
FIG. 6 features a section of the foam block before ambient air is forced therethrough.
Figure 7:
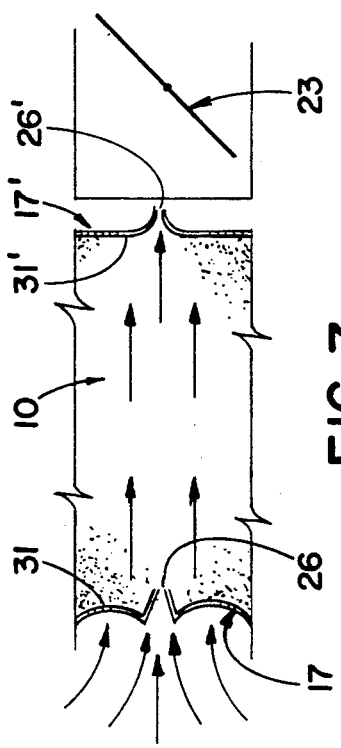
FIG. 7 shows the enlarged sectional view as shown in FIG. 6, but exaggerated to illustrate the ambient air passage therethrough.

FIG. 6 illustrates a portion of block 10 with slits 26, 26' therein without blower 24 operating. As shown in FIG. 7, with blower 24 activated, air rapidly moves through block 10 and side face 17 deforms with slit 26 slightly opening to allow a greater flow of air therethrough. FIG. 7 is exaggerated for clarity but the deformation of side face 17 is believed to increase the air flow through block 10. Side skins 31, 31' are shown with slits 26, 26' penetrating therethrough and are more than twice as deep as the thickness of the respective side skins 26, 26'.

Figure 8:
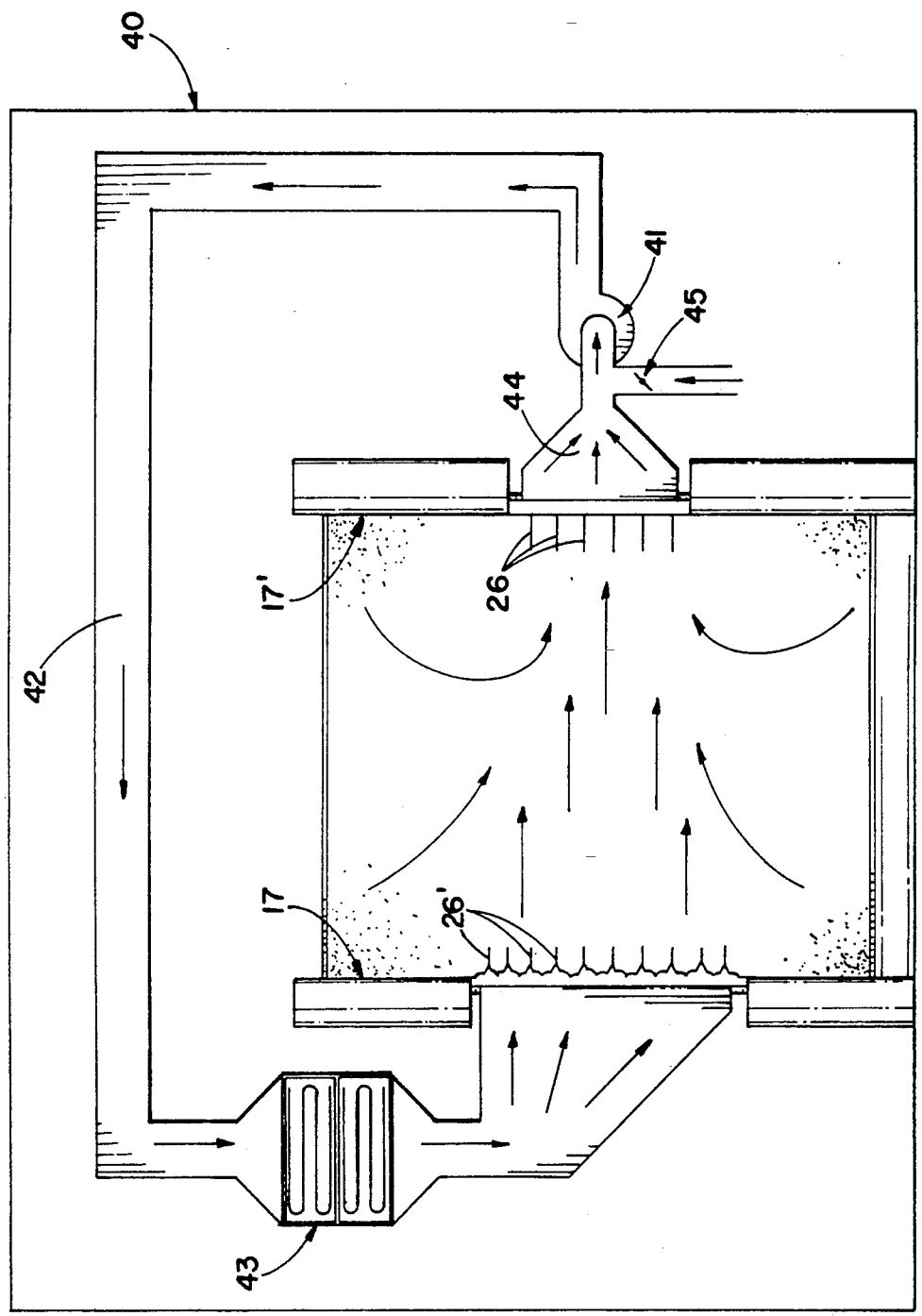
FIG. 8 demonstrates a schematic view of the process utilizing recirculation of air through the foam block.

The preferred form of the air treatment process is seen in FIG. 8 whereby foam block 10 is contained within a closed air infiltration chamber 40 (shown schematically) with slits 26, 26' along block 10. As would be understood, block 10 would have the top, bottom, ends and sides covered as earlier explained to prevent air penetration except for the slit areas and air is drawn through block 10 by fan 41 which delivers air to heat exchanger 43 through return conduit 42. Damper 45 allows fresh ambient air to be mixed with the recirculating air if desired. In the conventional continuous process of forming polyurethane foams, polyether polyols, tin catalyst, blowing agents, water, amines, isocyanates and other chemical compounds are utilized in the foam reaction and production. After the exothermic reaction occurs, various residual and reactant compounds of a volatile or semi-volatile nature remain in the foam block. It has been found that by recirculating the reactant laden air through foam block 10 as shown in FIG. 8 immediately after the exothermic reaction, the gaseous reactant products remaining are removed and/or distributed throughout foam block 10 evenly providing compression-set results of greater consistency from side to side and top to bottom throughout block 10. Also, by using heat exchanger 43, the temperature of the recirculating air and subsequently block 10 can be controlled along with the humidity. Ambient air can be mixed with the reactants by opening chamber 45. Under certain circumstances it may not be necessary to cool or dehumidify the air which is being recirculated through block 10 and under other circumstances, depending on the temperatures and specific chemical reactants present, it may be desirable to do so. A typical foam block of fifty foot length, six foot width and forty-two inches in height may be infiltrated with recirculating air for a period of twenty-five minutes, utilizing 75° F. air to quickly post treat and cure the foam block for storage, shipping or further processing.

The illustrations and examples provided herein are for explanatory purposes and are not intended to limit the scope of the appended claims.

We claim:

1. A process for post treating cellular foam having gaseous reactant products therein comprising the steps of:
    (1) simultaneously slitting opposing faces of the foam by relative movement between the foam and a blade assembly;
    (2) passing air through the slits;
    (3) directing the air through the foam; and
    (4) withdrawing air through one of the opposing faces to remove and evenly distribute the reactant products throughout the foam to achieve desirable compression-set qualities.

2. The process of claim 1 wherein the step of slitting opposing faces of the foam comprises slitting the foam to a depth of one-eight to three-eight inches.

3. The process of claim 2 wherein the step of slitting the face to a depth of one-eight to three-eight inches comprises slitting the face to one-fourth inch.

4. The process of claim 1 wherein the step of slitting opposing faces of the foam comprises slitting the faces with fixed blades.

5. The process of claim 1 comprising slitting the faces with multiple blades in parallel alignment.

6. The process of claim 1 comprising slitting at least 50-60% of the surface area of the faces.

7. The process of claim 1 comprising slitting the midsection of the faces.

8. The process of claim 1 wherein slitting opposing faces comprises slitting the faces with a thin blade.

9. A process for post treating a flexible cellular foam block having skin on the faces thereof and containing gaseous reactant products comprising the steps of:
    (a) simultaneously slitting the midsection of opposing faces to a depth beyond the face skin by passing the foam through multiple, parallel aligned blades positioned on each side of the foam;
    (b) covering the block except for the slit faces with a substantially air impervious sheet; and
    (c) deforming at least one of said faces by rapidly urging ambient air into one of the slit faces by withdrawing air through the other of said slit faces by a blower assembly contiguous thereto to remove and evenly distribute said reactant products throughout the foam to achieve desirable compression-set qualities.

10. The process of claim 9 wherein the step of slitting the midsection comprises slitting the midsection to a depth of at least twice the thickness of the side skin.

11. The process of claim 9 wherein the step of slitting the midsection comprises slitting a height along the midsection of 50-60% of the block height.

12. The process of claim 9 wherein the step of urging ambient air into one of the slit faces comprises urging ambient air having a relative humidity of less than 90%.

13. The process of claim 9 and including the step of adjusting the blades to the desired cutting depth.

14. A process for post treating a flexible polyurethane cellular foam having gaseous reactant products therein comprising the steps of:
    (1) simultaneously slitting opposing faces of the foam;
    (2) deforming one of the slit faces by withdrawing air therethrough, and
    (3) directing the withdrawn air through an opposing slit face of the foam in a closed recirculation path to evenly distribute reactant laden air throughout the interior of the foam to achieve desirable compression-set qualities of the foam.

15. The process of claim 14 and including the step of passing the withdrawn air through a heat exchanger.

16. The process of claim 15 wherein the step of passing the air through a heat exchanger comprises cooling the air in the heat exchanger.

17. The process of claim 15 wherein the step of passing the air through a heat exchanger comprises dehumidifying the air.

18. The process of claim 14 comprising recirculating the air for less than one hour.

19. The process of claim 14 comprising recirculating the reactant laden air for twenty-five minutes.

* * * * *